(No Model.) 2 Sheets—Sheet 1.
D. C. FRAZEUR & W. J. DAVIS.
ANIMAL TREAD POWER.
No. 411,986. Patented Oct. 1, 1889.
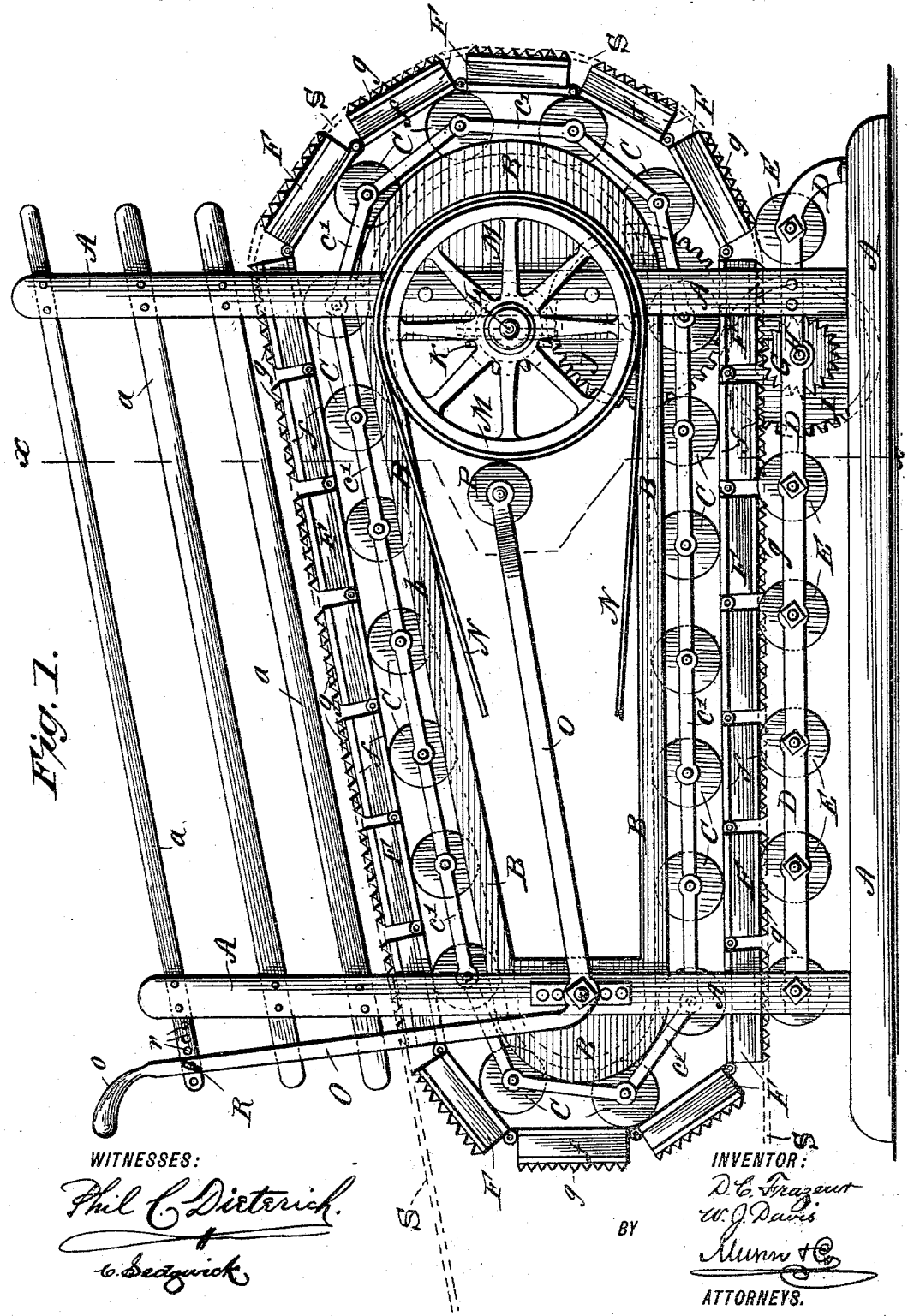
WITNESSES:
INVENTOR:
ATTORNEYS.

(No Model.) 2 Sheets—Sheet 2.
D. C. FRAZEUR & W. J. DAVIS.
ANIMAL TREAD POWER.
No. 411,986. Patented Oct. 1, 1889.
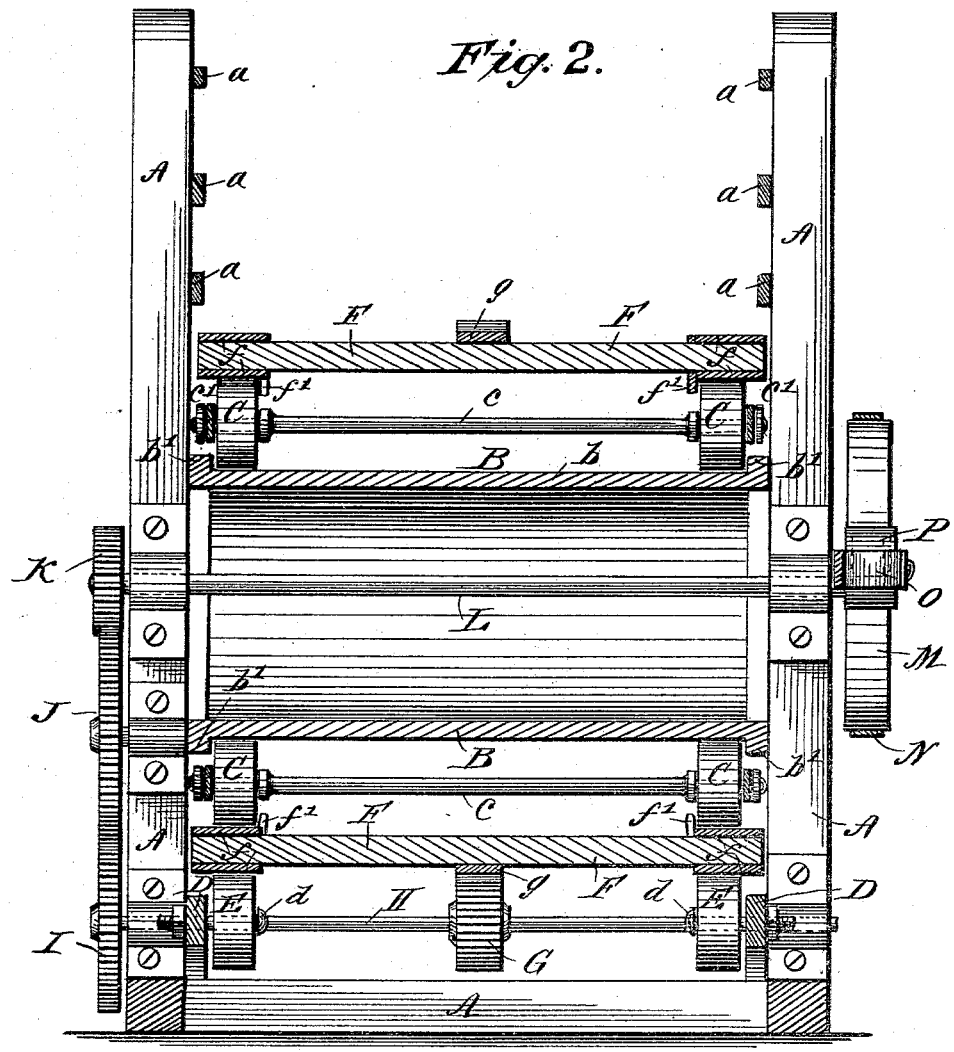
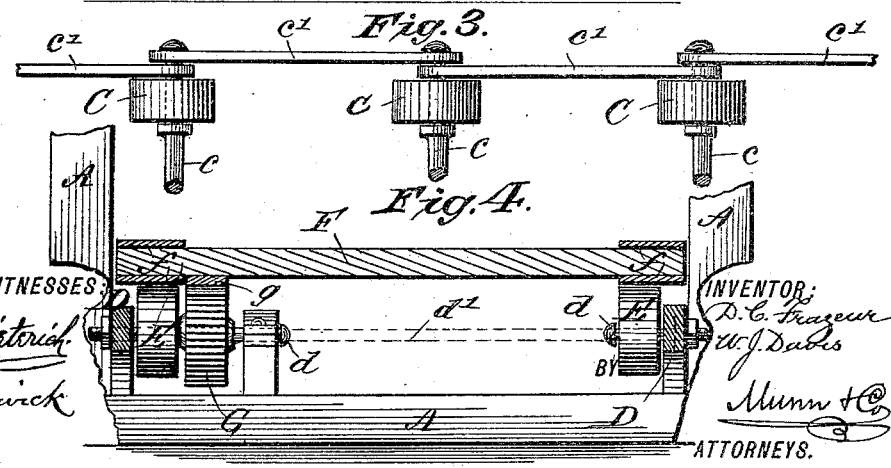

UNITED STATES PATENT OFFICE.

DAVID C. FRAZEUR AND WILLIAM J. DAVIS, OF NEW MARKET, NEW JERSEY.

ANIMAL TREAD-POWER.

SPECIFICATION forming part of Letters Patent No. 411,986, dated October 1, 1889.

Application filed October 18, 1888. Serial No. 288,421. (No model.)

*To all whom it may concern:*

Be it known that we, DAVID C. FRAZEUR and WILLIAM J. DAVIS, both of New Market, in the county of Middlesex and State of New Jersey, have invented a new and Improved Animal Tread-Power, of which the following is a full, clear, and exact description.

Our invention relates to a tread-power for operation by horses or other animals, and has for its object to provide a simple, efficient, durable, and easy-working machine of this character.

The invention consists in certain novel features of construction and combinations of parts of the tread-power, all as hereinafter described and claimed.

Reference is to be had to the accompanying drawings, forming a part of this specification, in which similar letters of reference indicate corresponding parts in all the figures.

Figure 1 is a side elevation of a tread-power constructed in accordance with our invention. Fig. 2 is a vertical transverse section thereof taken on the line $x$ $x$ of Fig. 1. Fig. 3 is a detail plan view of one end of three of the transverse axles or rods, rollers, or wheels thereon, and links connecting the axles and rollers in an endless chain which supports the lags or treads of the machine; and Fig. 4 is a detail transverse vertical sectional elevation of the lower portion of a modified form of the tread-power, as adapted for operation by one horse.

The machine-frame A consists of suitable side sills and uprights connected by cross-bars in a substantial structure adapted to support the operating parts, the upper ends of the uprights of the frame being connected by suitable rails or guide-bars $a$, ranging along the opposite sides of the treadway as guides or guards to the animal or animals working the machine.

To the frame A is fixed by suitable bolts or otherwise a track B, preferably having rounded ends, one end made higher or deeper than the other end, and the lower side of the track is or may be level, as shown, while its upper side $b$ slopes downward toward the rear end of the machine, and is provided at and along each edge with an upwardly-projecting flange or lip $b'$, forming guards or rails to prevent lateral displacement of the endless belt of rollers or wheels C, which travel around the track, as presently explained. The track may be built up of transversely or longitudinally ranging planks fixed to suitably-shaped side plates bolted to the frame; or it may be made in any other preferred manner, provided it affords support for the endless belt of rollers. Below the track B suitable side bars D D are fixed to opposite sides of the frame, and to these bars are held transversely-ranging shafts or stub-axles $d$, on which a lower series of rollers or wheels E are journaled, so as to give an anti-friction support to the lower or returning side of the endless belt of lags or tread-bars F, which in turn holds up the lower or returning side of the endless belt of rollers C to the lower side or face of the track B. If desired, the stub-axles $d$ may be substituted by continuous axles extending clear across the frame, as indicated in dotted lines at $d'$ in Fig. 4 of the drawings, and supporting one of the bearer-wheels E at each end.

The lag-supporting rollers or wheels C may be made with plain faces or peripheries to run directly on the track B and between its side guard-flanges $b'$; or the rollers may have peripheral flanges running at the inner edges of the guard rails or flanges $b'$, on which the rollers would then run. The rollers are mounted at opposite ends of shafts or axles $c$, having shoulders or collars at the inner sides of the rollers and projecting beyond their outer sides sufficiently to receive the ends of pairs of links $c'$, by which the rollers are connected in an endless chain adapted for continuous travel on the track B. (See Fig. 3 of the drawings.)

The lags or treads F of the machine are hinged together in any ordinary or approved manner to form an endless chain of lags or treads which travel on the rollers or wheels C E, and the ends of the lags at both their faces are provided with plates $f$, which run on these rollers and prevent undue wear of the lags, which may also have lips or flanges $f'$ at the sides of the rollers C to prevent lateral displacement of the lags from the rollers or contact of the ends of the lags with the frame.

When the machine is designed, as shown in Figs. 1 and 2 of the drawings, for operation by two horses working abreast, the lags F will be provided at their outer faces and transverse centers with racks $g$, which, as the endless chain of lags moves around the track upon the rollers C E, will engage a gear-wheel or pinion G, fast on a transverse shaft H, which is journaled on the frame A, and carries outside the frame a gear-wheel I, which meshes with an idle-gear J on the frame, and which in turn meshes with a gear-wheel or pinion K, which is fast to a driving-shaft L, journaled on the frame and preferably ranging across it between the opposite sides of the stationary track B. This shaft L carries at its other end a fly-wheel M, from which a driving-belt N may pass either rearward or forward to a pulley on a sawing, thrashing, or other machine to operate it from the tread-power. The two horses or other animals will thus walk on the lags, one at each side of the lag-racks $g$; but when the machine is intended to be worked by one animal, the racks $g$ will be placed at one end of the lags and engage a pinion G, correspondingly located, as shown in Fig. 4 of the drawings.

It is obvious that as the endless belt of lags F is turned by the tread of the animal or animals on it the endless chain of rollers or wheels C will also be turned around the track B, and the lag-belt will operate with very little friction and will travel at about twice the speed of the roller-belt; hence the lag-belt may be set at much less incline than is possible in other constructions, and the entire weight of the lag-belt and the animals operating it will be taken between opposite peripheral parts of the rollers C, thereby relieving the roller axles or shafts of all strains of this nature to which they are subject in other constructions, and promoting the easy and effective operation of the machine without greatly fatiguing the horses, and assuring its durability.

At one side of the frame A there is fulcrumed at its angle an elbow-lever O, which at its forward end carries a brake-wheel P, which will be forced to the fly-wheel M when the rear end of the lever is forced forward by pressure on its handle $o$ by the attendant, who thus may regulate or control the speed as may be desirable or necessary to accommodate the work being done or the strength of the animal or animals operating the machine. The brake-lever is provided near its handle with a screw or pin R, which may be set into any one of a series of holes $r$ in the adjacent guard-bar $a$, or in the machine-frame, to control the pressure of the brake-wheel P on the fly-wheel M for stopping the machine or for regulating its speed or for locking the lever so as to hold the brake-wheel entirely clear of the fly-wheel, as occasion may require.

It is manifest that in our construction there is combined a supporting-frame, a track or guide fixed thereto, an endless chain of rollers running freely on the track, and an endless chain of lags running freely on the endless chain of rollers; hence the endless chains of rollers and lags are supported entirely independent of drums or wheels which in other constructions transmit the power, and the speed of travel of the chain of lags is independent of the speed of travel of the chain of rollers. We make special mention of this construction irrespective of the manner in which the power of the traveling endless chain of lags is applied or transmitted, as it is obvious that neither the lag-chain nor the roller-chain which supports it from the track or guide is held back or retarded by direct frictional contact with more or less heavy drums or wheels on which a lag-chain or roller-chain have either wholly or partly been supported in other constructions. In other words, our endless chain of lags does not either wholly or in part have direct frictional contact with a drum or track which could retard its motion, and the lags are not held back by one or more supporting endless chains of rollers, which themselves are held back or retarded by frictional contact with a drum or drums from which the power of the machine is taken; hence the chain of lags is entirely free to travel independently of the speed of travel of the chain of rollers and moves about twice as fast as the roller-chain which supports it, and the entire power of the endless chain of lags is thus free to be applied effectively in any preferred manner. We also propose at times to place a driving-belt S directly onto the endless chain of lags, as indicated in dotted lines in Fig. 1 of the drawings, and lead the belt directly to the driving-pulley of a thrashing or other machine to be driven. This belt S may be made of leather, rubber, metal, or other suitable material.

Having thus described our invention, what we claim as new, and desire to secure by Letters Patent, is—

1. The combination, in a tread-power, of a supporting-frame, a track or guide thereon, an endless chain of rollers running freely on the track and independently of drums or wheels which transmit the power of the machine, and an endless chain of lags running freely on the endless chain of rollers and independently of drums or wheels which support the endless chain of rollers or which transmit the power of the machine, substantially as described, for the purposes set forth.

2. The combination, in a tread-power, of a supporting-frame, a track or guide thereon, an endless chain of rollers running freely on the track, an endless chain of lags running freely on the endless chain of rollers and provided with racks, and gearing engaged by the racks and transmitting the power of the machine, substantially as described, for the purposes set forth.

3. The combination, in a tread-power, of a supporting-frame, a track or guide thereon, a series of anti-friction wheels journaled below the track, an endless chain of rollers running freely on the track and independently of drums or wheels which transmit the power of the machine, and an endless chain of lags running freely on the endless chain of rollers and independently of drums or wheels which support the endless chain of rollers or which transmit the power of the machine, said endless chain of lags running between the endless chain of rollers and the lower anti-friction wheels, substantially as described, for the purposes set forth.

4. The combination, in a tread-power, of a supporting-frame, an endless track B thereon, an endless chain of rollers C, running freely on the track, an endless chain of lags F, provided with tracks $g$ and running freely on the endless chain of rollers, a shaft H, a gear-wheel G thereon engaged by the lag-racks, and gearing driven by the shaft H and transmitting the power of the machine, substantially as herein set forth.

5. The combination, in a tread-power, of a supporting-frame, an endless track B thereon, an endless chain of rollers C, running freely on the track, a series of anti-friction wheels E, journaled to the frame below the track, an endless chain of lags F, having racks $g$, and running freely on the endless chain of rollers and over the anti-friction wheels E, a shaft H, a gear-wheel G thereon engaged by the lag-racks, and gearing driven by the shaft H and transmitting the power of the machine, substantially as described, for the purposes set forth.

DAVID C. FRAZEUR.
WILLIAM J. DAVIS.

Witnesses:
CHARLES S. DEWEY,
WILLIAM R. CUDINGTON.